United States Patent
Lei et al.

(10) Patent No.: US 10,135,110 B2
(45) Date of Patent: Nov. 20, 2018

(54) VEHICLE ANTENNA ASSEMBLY WITH COOLING

(71) Applicant: Ford Global Technologies, LLC, Dearborn, MI (US)

(72) Inventors: Oliver Lei, Windsor (CA); Allen R. Murray, Lake Orion, MI (US); David Richard Tengler, West Bloomfield, MI (US); Leo James Lanctot, Jr., South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 406 days.

(21) Appl. No.: 14/967,423

(22) Filed: Dec. 14, 2015

(65) Prior Publication Data
US 2017/0170542 A1    Jun. 15, 2017

(51) Int. Cl.
| | |
|---|---|
| *B60L 1/00* | (2006.01) |
| *B60L 3/00* | (2006.01) |
| *H01Q 1/02* | (2006.01) |
| *B60R 16/033* | (2006.01) |
| *H01Q 1/32* | (2006.01) |
| *H02J 7/35* | (2006.01) |

(52) U.S. Cl.
CPC ............ *H01Q 1/02* (2013.01); *B60R 16/033* (2013.01); *H01Q 1/3275* (2013.01); *H02J 7/355* (2013.01)

(58) Field of Classification Search
USPC .......................................................... 307/9.1
See application file for complete search history.

(56) References Cited

U.S. PATENT DOCUMENTS

| | | | |
|---|---|---|---|
| 4,470,263 A | 9/1984 | Lehovec et al. | |
| 4,710,588 A | 12/1987 | Ellion | |
| 5,197,291 A | 3/1993 | Levinson | |
| 5,892,656 A * | 4/1999 | Bass ............... | H01L 35/00 136/203 |
| 6,662,572 B1 | 12/2003 | Howard | |
| 8,418,477 B2 | 4/2013 | Klein et al. | |
| (Continued) | | | |

FOREIGN PATENT DOCUMENTS

| | | |
|---|---|---|
| DE | 102007055462 A1 | 5/2009 |
| DE | 102010064343 A1 | 7/2012 |
| (Continued) | | |

OTHER PUBLICATIONS

GB Search Report dated May 3, 2017, for corresponding Application No. GB1620873.8, 3 pages.
(Continued)

*Primary Examiner* — Rexford Barnie
*Assistant Examiner* — Dru Parries
(74) *Attorney, Agent, or Firm* — Brooks Kushman P.C.

(57) ABSTRACT

A vehicle may include a battery and an antenna assembly mounted on the vehicle. The antenna assembly may be mounted on the roof of the vehicle. The antenna assembly may include a cooling arrangement electrically connected with the battery, a pair of thermally conductive plates, and a semiconductor sandwiched between the plates, electrically connected with the battery, and configured to, in response to a temperature difference between the plates, generate a current for the battery. A photovoltaic generator may be electrically connected with the battery to increase electrical generation.

12 Claims, 2 Drawing Sheets

(56) References Cited

U.S. PATENT DOCUMENTS

| | | |
|---|---|---|
| 8,420,926 B1 | 4/2013 | Reedy et al. |
| 8,487,822 B1 | 7/2013 | Jennings |
| 2004/0128041 A1 | 7/2004 | Hiller et al. |
| 2008/0155991 A1 | 7/2008 | Lee |
| 2009/0262033 A1 | 10/2009 | King et al. |
| 2009/0295654 A1 | 12/2009 | Baker |
| 2011/0209744 A1 | 9/2011 | Hu |
| 2012/0192920 A1 | 8/2012 | McCowan et al. |
| 2013/0291919 A1 | 11/2013 | Lu |

FOREIGN PATENT DOCUMENTS

| | | |
|---|---|---|
| DE | 102011051507 A1 | 10/2012 |
| DE | 102013218022 A1 | 3/2015 |
| JP | H08274519 A | 10/1996 |
| JP | 2000101116 A | 4/2000 |
| JP | 2000323910 A | 11/2000 |
| JP | 2006074919 A | 3/2006 |
| JP | 2007166721 A | 6/2007 |
| JP | 2008043095 A | 2/2008 |
| JP | 2010231419 A | 10/2010 |
| KR | 1020090080710 A | 3/2011 |
| WO | 2006110858 A2 | 10/2006 |
| WO | 2012143003 A4 | 10/2012 |
| WO | 2015121609 A1 | 8/2015 |

OTHER PUBLICATIONS

GB Search Report dated Mar. 3, 2017, for corresponding GB Application No. 1620873.8, 5 pages.

\* cited by examiner

VEHICLE ANTENNA ASSEMBLY WITH COOLING

TECHNICAL FIELD

The present disclosure relates to vehicle antenna assemblies and arrangements to cool the same.

BACKGROUND

A vehicle may have systems including an antenna assembly purposed to communicate internally or externally. The systems may have mounting locations that subject them to environmental hazards. These hazards may impact their performance. One of these hazards may include harsh temperatures. A previous solution to high temperature exposure was to include a cavity in the antenna assembly to allow water to pool. In addition, movement of the vehicle provided some cooling to the communications system through convection but only after a period of high-speed movement.

SUMMARY

A vehicle may include a battery and an antenna assembly mounted on the roof. A pair of thermally conductive plates and a semiconductor sandwiched between the plates may draw a current from the battery in response to a harsh temperature on one of the plates. The semiconductor may be configured to induce a temperature such that the one of the plates has a temperature less than a temperature of the other of the plates and less than the antenna assembly. A pair of thermally conductive plates and a semiconductor sandwiched between the plates may generate a current for a battery in response to a temperature difference between the plates. The antenna assembly may take a shark fin form. The antenna assembly may include a photovoltaic solar panel defining an exterior of the assembly that provides a current to the battery.

DETAILED DESCRIPTION

Figure 1:
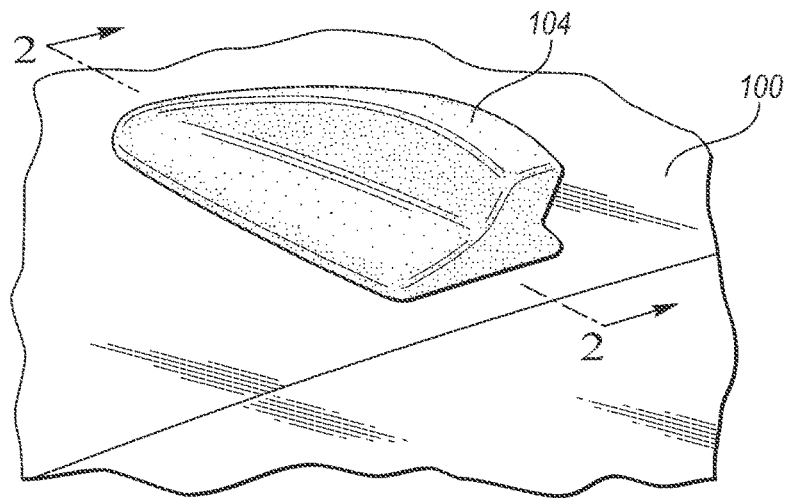
FIG. 1 is a perspective view of a vehicle and antenna assembly.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Modern vehicles require communication systems for emergency notifications, telematics, entertainment, remote door unlocking, wireless internet, smartphone application communication, and other ancillary activities. An antenna assembly for a communication system may be positioned on the vehicle in many different locations and orientations. Some of these orientations may subject the antenna assembly to hazardous or harsh environments. For instance, an antenna assembly may be mounted on the roof of a vehicle, which may expose the antenna to the elements of a hot desert or frozen tundra. Extreme temperatures may impact the performance of the antenna assembly.

Further, an operational communication system may be advantageous after an accident. Such a communication system, however, may become disconnected from the primary power source during the accident. Assume, for example, that the primary power source is a battery located at the front of the vehicle. In a front-end collision, the battery may become unable to provide electricity to the communication system. Certain embodiments disclosed herein may provide sustainable and readily available cooling of an antenna assembly that does not require vehicle movement (e.g., convection cooling), and/or provide a dedicated self-charging battery source separate from the vehicle's typically supply bus for additional cooling and protection. This may allow the antenna assembly to function in hazardous environments and after an accident.

An antenna assembly may include an antenna having a monopole, dipole, or other wave propagation configuration. The antenna assembly may take on many different shapes and sizes (e.g., a shark-fin shape, a traditional mast shape, a glass mounted configuration, a bee-sting shape, a blade shape). The antenna assembly may also include a transceiver connected to the antenna. The transceiver may use any frequency on the electromagnetic spectrum to communicate information. For example, the system may use electromagnetic radiation within the radio frequency band. An antenna assembly may also include a processor or array of processors used to create or prepare data for transmission. The operability of these systems may degrade when exposed to extreme temperatures or harsh environments.

The antenna assembly may require electricity to operate. A battery may be used to provide electricity to the one or both of the transceiver or processor. The battery may be the starter, lighting, and ignition (SLI) battery of the vehicle. An SLI battery, as is used in many vehicles, may be unavailable after an accident. A second battery may be used to provide electrical power to the antenna assembly during these emergent events or after the primary power source becomes unavailable for other reasons. Any type of battery including different combinations of electrolyte, anode material, cathode material, or combination thereof may power the antenna assembly. In addition, capacitors may also be used to substitute or supplement the battery. Some common batteries may include nickel-metal hydride, lead-acid, and lithium-ion. The second battery may be very small and incorporated in the antenna assembly or a larger, separate unit disposed nearby. For example, a disk type watch battery could provide emergency electricity while adding minimal weight or size.

This second battery may be recharged using the vehicle's electrical system or other systems, such as a solar panel. The solar panel may include a combination of photovoltaic and thermoelectric devices to generate a direct current. For example, a unified solar cell including the photovoltaics and thermoelectrics may be disposed on the antenna assembly. In addition, the photovoltaic cell may be disposed on the antenna assembly separate from the thermoelectrics. A photovoltaic may be used to generate an electric current using a set of dissimilarly doped semiconductors. Any type of semi-conductive material may be used to generate an electric current from solar radiation. For example, silicon may be used as a semiconductor. Many types of materials and crystalline structures that are known or otherwise appropriate may be used to provide the most energy transfer (electricity generation) and heat reduction.

Regarding thermoelectrics, many different conductor and semiconductor configurations can create electrical energy from heat energy. For example, two mated, dissimilar conductors or semiconductors may create a direct current. In addition, two dissimilar semiconductors sandwiched between two thermal conductors may create a direct current when there is a difference in temperature between the plates. Any other known or otherwise appropriate apparatus that generates electricity via temperature differences may be used. In addition, any type of conductor or semiconductor may be used. Any type of thermally conductive material for the plates may be used. For example, a metallic plate consisting of copper or aluminum may be used to provide efficient thermal conduction. Any type of semi-conductive material may be used to generate an electric current. For example, silicon may be doped in alternating pairs to provide dissimilar free electrons to generate an electric current. The generated current may be applied to recharge the battery. The solar panel may also provide electricity directly to the antenna assembly.

Either the photovoltaic or thermal electric generator may be disposed on the antenna assembly to provide thermal and solar radiation shielding from a harsh environment. This may provide a source of electricity for the antenna assembly, while shielding the antenna from degradation due to extreme temperatures and radiation. The energy source would be available even if an accident made the vehicle's SLI battery or traction battery unavailable.

An additional pair of thermally conductive plates sandwiching a semiconductor may be used to change the temperature of the antenna assembly. A current may be applied to the semiconductor having segments that are dissimilarly doped. The current may cause the pair of plates to diverge in temperature, meaning one of the plates may be cooled and the other may be warmed. The cooled plate may be placed in proximity or attached to the antenna assembly to draw heat from the assembly. The cooled plate may ensure that the antenna assembly is cooled sufficiently when under extreme temperatures, providing increased availability of the communications system. The warm plate may be placed in a ventilation duct, which evacuates heat from the area to the atmosphere or deposits it inside the vehicle cabin. A fan for the ventilation duct may be provided to increase airflow and heat transfer. This configuration can provide sustainable and readily available cooling of the antenna assembly, and does not require vehicle movement.

The aforementioned thermoelectric devices may be defined as a Peltier cooler or Seebeck generator. A Peltier cooler is a type of thermoelectric device that creates a temperature difference between two plates by passing current through dissimilar metals or dissimilarly doped semiconductors. A Seebeck generator employs the Seebeck effect to generate a current from dissimilarly doped semiconductors or metals when a temperature difference between the two metal plates exists. Although described as two separate elements, a Peltier cooler and Seebeck generator may be implemented as a single unit with two distinct modes of operation. A thermoelectric device may be placed in a temperature difference generation mode to create a difference in temperature between the two plates, or it may be placed in a generating mode to generate electricity from a temperature difference between the plates. Implementation of a dual-mode unit may reduce costs and meet size requirements.

Referring now to FIG. 1, a vehicle 100 is depicted. An antenna assembly 104 may be mounted to the roof of the vehicle 100.

Figure 2:
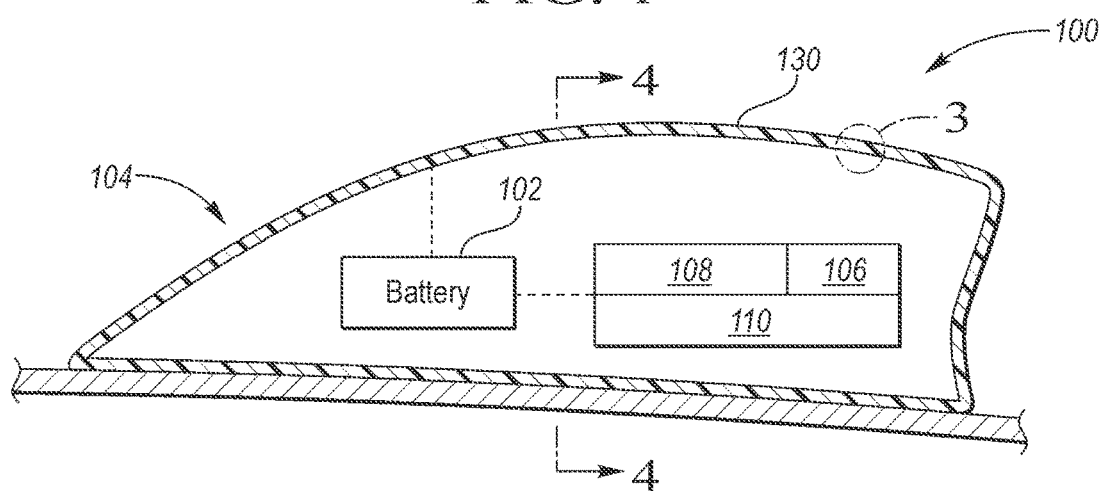
FIG. 2 is a schematic diagram of a vehicle including an antenna assembly and a battery.

Referring now to FIG. 2, the vehicle 100 may include the antenna assembly 104 having an antenna 106 and associated electronics 108 configured to communicate with other devices internally or externally. The antenna 106 and electronics 108 may be adjacently oriented within the antenna assembly 104 or separately disposed. The antenna 106 may be configured to radiate a signal from the electronics 108 or receive a radiated signal from another communications device. The antenna assembly 104, antenna 106, and electronics 108 may be in contact or arranged with a Peltier cooler or Peltier cooling arrangement 110. The Peltier cooler 110 may provide cooling to the antenna assembly or surrounding area to ensure that the electronics 108 and other components are capable of providing a signal to the antenna 106. The Peltier cooler 110 may adjust the current drawn based on a required amount of cooling. The Peltier cooler 110 may vary the amount of cooling as necessary as a temperature difference between its plates increases. The Peltier cooler 110 may remain dormant until the temperature of the antenna assembly 104 or electronics 108 reaches a particular temperature threshold. Many of the electronics in use today have a maximum operating temperature of 85° C. This threshold may be set at 80° C.

The antenna assembly 104 may include or be connected to a battery, backup battery, or auxiliary battery 102. The battery 102 may be connected to or isolated from the vehicle's electrical system (not shown). The battery may be configured to provide power to the Peltier cooler 110 allowing the Peltier cooler 110 to utilize its thermoelectric capabilities. The battery 102 may be cooled by the Peltier cooler 110. The battery 102 may also be configured to provide power to the antenna 106, the electronics 108, or both. An isolated battery 102 may be able to provide power required by the antenna assembly 104 in an emergency or if the assembly 104 is otherwise disconnected from power. The antenna assembly 104 may also include a solar panel 130. The solar panel 130 may provide energy to the antenna assembly 104 or recharge the battery 102. For instance, a solar panel 130 exposed to sunlight and heat may generate electrical energy to charge the battery 102. In the event of an accident, the battery 102 and solar panel 130 may cooperatively or individually provide electricity to the Peltier cooler 110, the electronics 108, the antenna 106, or a combination thereof. The solar panel 130 may have a shark-fin shape to cooperate with the antenna assembly's shape. Of course, each embodiment contemplated need not include every element mentioned above. For example, the antenna assembly 104 may only include a Peltier cooler to cool the antenna assembly 104 without a battery or a solar panel.

Figure 3:
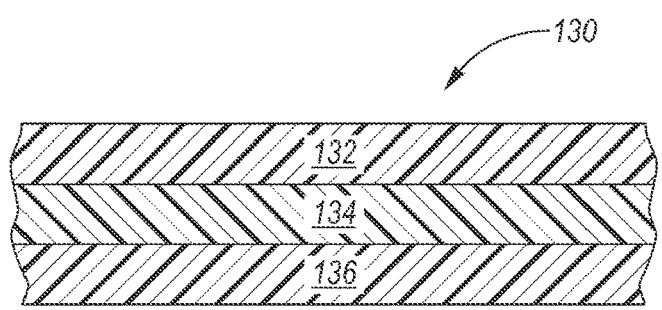
FIG. 3 is a side view, in cross-section, of an antenna assembly having a solar panel.

Referring now to FIG. 3, a side view, in cross-section, of the solar panel or photovoltaic electric generator arrangement 130 is shown. The solar panel 130 may include a laminated covering 132, photovoltaic electric generator 134, and a thermoelectric device 136, as discussed in FIG. 5, configured to utilize the Seebeck effect to generate a direct current. The laminated covering 132 may provide protection from the elements, and the photovoltaic electric generator 134 and thermoelectric device 136 may generate an electric current.

Figure 4:
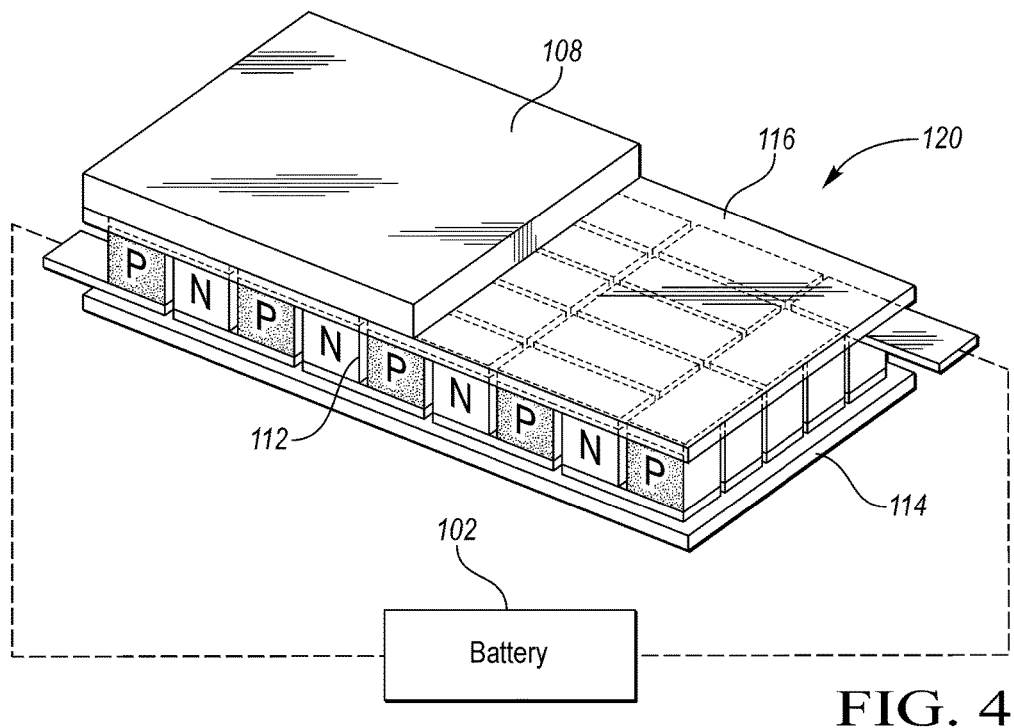
FIG. 4 depicts a thermoelectric device configured to draw energy from a battery.

Referring now to FIG. 4, a thermoelectric device 120 may have a group of dissimilarly doped semiconductors 112 sandwiched between a hot plate 114 and a cold plate 116. The thermoelectric device 120 may be configured as a Peltier cooler 110 or Peltier cooling arrangement, as depicted in FIG. 2, to provide cooling to the electronics 108. Similarly, the Peltier cooler 110 may be configured to cool the entire antenna assembly 104, as shown in FIG. 2. The thermoelectric device 120 may draw current from the battery 102 in order to create a temperature differential between the pair of thermoelectrically conductive plates 114, 116.

Figure 5:
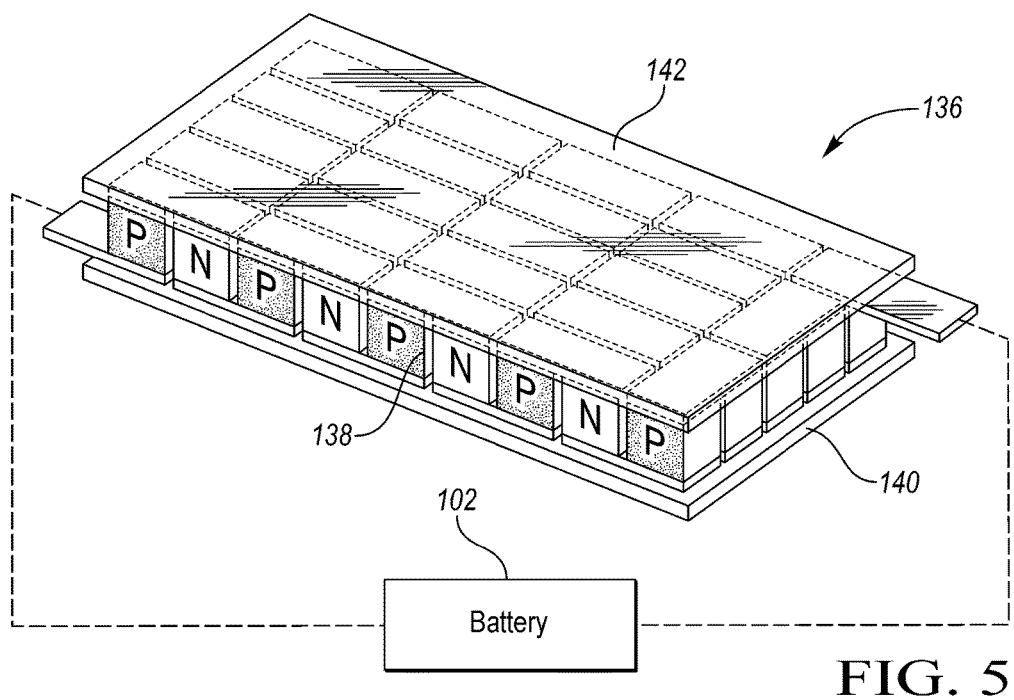
FIG. 5 depicts a thermoelectric device configured to generate electricity.

Referring now to FIG. 5, a second thermoelectric device 136, or a device configured with dual modes of operation, may also be configured to utilize the Seebeck effect. The Seebeck effect causes the two dissimilarly doped semiconductors 138 to generate a current when the semiconductors 138 are connected to two plates 140, 142 having a temperature differential. The current generated by the thermoelectric device 136 may supply electrical energy to the battery 102 or to an antenna assembly (not shown). The second thermoelectric device 136 may be disposed on the solar panel 130.

Although described as two separate elements, the Peltier cooler 110 and Seebeck device 136 may be implemented as a single device with distinct modes of operation. A thermoelectric device may be placed in a cooling mode to cool the antenna assembly 104 and placed in a generating mode to generate electricity when cooling is not needed or unavailable. Implementation of a single dual-mode device may reduce costs and meet size requirements. Switching between modes may be accomplished by using current direction restriction devices (e.g., diode).

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An antenna assembly comprising:
   an antenna assembly mounted to a roof of a vehicle;
   a pair of thermally conductive plates, one but not both of the plates being in contact with the assembly; and
   a semiconductor sandwiched between the plates and configured to, in response to a current passing through the semiconductor, induce a temperature difference between the plates to draw heat away from the assembly, wherein the semiconductor is further configured such that a magnitude of the temperature difference increases as a magnitude of the current increases.

2. The antenna assembly of claim 1, wherein the semiconductor is configured to induce the temperature difference such that the one of the plates has a temperature less than a temperature of the other of the plates.

3. The antenna assembly of claim 1, wherein the plates and semiconductor form a Peltier cooler.

4. The antenna assembly of claim 1 further comprising a backup battery, separate from an auxiliary battery of the vehicle, configured to supply the current.

5. The antenna assembly of claim 1, wherein the antenna assembly has a shark fin form.

6. The antenna assembly of claim 1, wherein the antenna assembly includes a solar panel defining an exterior of the assembly.

7. The antenna assembly of claim 6, wherein the solar panel includes a photovoltaic cell electrically connected with a battery.

8. The antenna assembly of claim 6, wherein the solar panel includes a pair of thermoelectrically conductive plates electrically connected with a battery, and a semiconductor sandwiched between the plates and configured to, in response to a temperature difference between the plates, generate a current for the battery.

9. The antenna assembly of claim 1 further comprising, a controller configured to,
   in response to a temperature of the antenna assembly reaching a threshold, energize the semiconductor until the temperature falls below the threshold.

10. A vehicle comprising:
    a battery;
    an antenna assembly mounted to a roof of the vehicle and including a photovoltaic electric generator arrangement electrically connected with the battery;
    a pair of thermally conductive plates, one but not both of the plates being in contact with the assembly; and
    a semiconductor sandwiched between the plates and configured to, in response to a current passing through the semiconductor, induce a temperature difference between the plates to draw heat away from the assembly; and
    an other pair of thermoelectrically conductive plates electrically connected with the battery and disposed on the photovoltaic electric generator, and an other semiconductor sandwiched between the other plates and configured to, in response to a temperature difference between the other plates from radiated heat energy absorbed by the photovoltaic electric generator, generate a current for the battery.

11. The vehicle of claim 10, wherein the semiconductor is configured to induce the temperature difference such that the one of the plates has a temperature less than a temperature of the other of the plates.

12. The vehicle of claim 10, wherein the plates and semiconductor form a Peltier cooler.

* * * * *